(12) United States Patent
Yebka et al.

(10) Patent No.: US 10,975,207 B2
(45) Date of Patent: Apr. 13, 2021

(54) SYSTEM, METHOD, AND APPARATUS FOR ATTACHING STRUCTURES

(71) Applicant: LENOVO (Singapore) PTE. LTD., New Tech Park (SG)

(72) Inventors: Bouziane Yebka, Apex, NC (US); Philip John Jakes, Durham, NC (US); Tin-Lup Wong, Chapel Hill, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 40 days.

(21) Appl. No.: 16/355,567

(22) Filed: Mar. 15, 2019

(65) Prior Publication Data
US 2020/0291196 A1  Sep. 17, 2020

(51) Int. Cl.
*B29C 65/00* (2006.01)
*C08J 5/12* (2006.01)
(Continued)

(52) U.S. Cl.
CPC ............... *C08J 5/124* (2013.01); *C09J 7/38* (2018.01); *G05B 15/02* (2013.01); *G05B 19/041* (2013.01);
(Continued)

(58) Field of Classification Search
CPC ..... B29C 65/02; B29C 65/562; B29C 65/567; B29C 65/58; B29C 65/76; B29C 65/7814; B29C 66/0242; B29C 66/0342; B29C 66/12221; B29C 66/12241; B29C 66/124; B29C 66/1248; B29C 66/3032; B29C 66/30321; B29C 66/347; B29C 66/7311; B29C 66/73112; B29C 66/8264; B32B 38/10; B32B 43/006; Y10T 156/1153; Y10T 156/1911
See application file for complete search history.

(56) References Cited

U.S. PATENT DOCUMENTS 6,318,783 B1 * 11/2001 Knox ..................... B29C 65/58
29/91
6,439,622 B1 * 8/2002 Iwatsuki ................ B29C 65/56
123/184.57
(Continued)

FOREIGN PATENT DOCUMENTS

WO  WO-2010118082 A1 * 10/2010 ............ F16B 1/0014

*Primary Examiner* — Mark A Osele
*Assistant Examiner* — Nickolas R Harm
(74) *Attorney, Agent, or Firm* — Kunzler Bean & Adamson

(57) ABSTRACT

Apparatuses, methods, and systems are disclosed for attaching structures. One system includes: a device having a first structure attached to a second structure; a first polymer coupled to the first structure, wherein the first polymer has a first temperature profile and a first shape; and a second polymer coupled to the second structure. The second polymer has a second temperature profile and a second shape. The second shape interlocks the first shape. The first polymer and the second polymer secure the first structure to the second structure in response to the first polymer and the second polymer being in a first temperature range. The first polymer and the second polymer release the first structure from the second structure in response to the first polymer and the second polymer being in a second temperature range different from the first temperature range.

20 Claims, 6 Drawing Sheets

(51) Int. Cl.
    *C09J 7/38*        (2018.01)
    *G05B 19/04*     (2006.01)
    *G05B 19/042*    (2006.01)
    *G05B 15/02*     (2006.01)
    *B29C 65/02*     (2006.01)
    *B29C 65/56*     (2006.01)
    *B29C 65/76*     (2006.01)
    *B29C 65/78*     (2006.01)
    *B29C 65/58*     (2006.01)
    *B32B 38/10*     (2006.01)
    *B32B 43/00*     (2006.01)

(52) U.S. Cl.
    CPC .......... G05B 19/0423 (2013.01); *B29C 65/02* (2013.01); *B29C 65/562* (2013.01); *B29C 65/567* (2013.01); *B29C 65/58* (2013.01); *B29C 65/76* (2013.01); *B29C 65/7814* (2013.01); *B29C 66/0242* (2013.01); *B29C 66/0342* (2013.01); *B29C 66/124* (2013.01); *B29C 66/1248* (2013.01); *B29C 66/12221* (2013.01); *B29C 66/12241* (2013.01); *B29C 66/3032* (2013.01); *B29C 66/30321* (2013.01); *B29C 66/347* (2013.01); *B29C 66/7311* (2013.01); *B29C 66/73112* (2013.01); *B29C 66/8264* (2013.01); *B32B 38/10* (2013.01); *B32B 43/006* (2013.01); *C08J 2300/12* (2013.01); *Y10T 156/1153* (2015.01); *Y10T 156/1911* (2015.01)

(56) References Cited

U.S. PATENT DOCUMENTS

| | | | | |
|---|---|---|---|---|
| 9,915,381 | B2* | 3/2018 | Doole | .............. F16L 9/125 |
| 10,372,166 | B2* | 8/2019 | Gable | ............... H01Q 21/28 |
| 2009/0076591 | A1* | 3/2009 | Girton | .................. A61F 2/91 |
| | | | | 623/1.16 |
| 2012/0266417 | A1* | 10/2012 | Browne | ........... B65D 63/1027 |
| | | | | 24/16 R |
| 2014/0004294 | A1* | 1/2014 | Christophy | ........... B29C 39/10 |
| | | | | 428/101 |
| 2018/0073245 | A1* | 3/2018 | Kim | ................ B29C 45/0001 |

* cited by examiner

SYSTEM, METHOD, AND APPARATUS FOR ATTACHING STRUCTURES

FIELD

The subject matter disclosed herein relates to structures and more particularly relates to attaching structures.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be assembled and/or disassembled using a number of screws and/or related devices. It may be difficult to assemble and/or dissemble the information handling devices, or other devices, because of a large number of screws and/or related devices.

BRIEF SUMMARY

A system for attaching structures is disclosed. A method and apparatus also perform the functions of the system. In one embodiment, the system includes a device having a first structure attached to a second structure. In certain embodiments, the system includes a first polymer coupled to the first structure. In various embodiments, the first polymer has a first temperature profile and a first shape. In some embodiments, the system includes a second polymer coupled to the second structure. In certain embodiments, the second polymer has a second temperature profile and a second shape. In various embodiments, the second temperature profile is different from the first temperature profile. In some embodiments, the second shape is different from the first shape. In certain embodiments, the second shape interlocks the first shape. In various embodiments, the first polymer and the second polymer secure the first structure to the second structure in response to the first polymer and the second polymer being in a first temperature range. In some embodiments, the first polymer and the second polymer release the first structure from the second structure in response to the first polymer and the second polymer being in a second temperature range different from the first temperature range.

In some embodiments, the device is selected from a group including a computer, a phone, a tablet, a keyboard, a mouse, and a display. In one embodiment, the first temperature profile has a different shrinkage ratio than the second temperature profile.

In various embodiments, the first temperature range is greater than the second temperature range. In some embodiments, the first temperature range is less than the second temperature range.

A method for attaching structures, in one embodiment, includes forming a first polymer having a first temperature profile and a first shape. In certain embodiments, the method includes forming a second polymer having a second temperature profile and a second shape. In such embodiments, the second temperature profile is different from the first temperature profile, the second shape is different from the first shape, and the second shape interlocks the first shape. In some embodiments, the method includes coupling the first polymer to a first structure of an apparatus. In various embodiments, the method includes coupling the second polymer to a second structure of the apparatus. In such embodiments, the first polymer and the second polymer secure the first structure to the second structure in response to the first polymer and the second polymer being in a first temperature range, and the first polymer and the second polymer release the first structure from the second structure in response to the first polymer and the second polymer being in a second temperature range different from the first temperature range.

In some embodiments, the first temperature profile has a different shrinkage ratio than the second temperature profile. In various embodiments, the first temperature profile has a different melting temperature than the second temperature profile. In one embodiment, the first temperature range is greater than the second temperature range.

In some embodiments, the first temperature range is less than the second temperature range. In certain embodiments, the second temperature range includes a third temperature range greater than the first temperature range and a fourth temperature range less than the first temperature range.

In some embodiments, coupling the first polymer to the first structure of the apparatus includes coupling the first polymer to the first structure of the apparatus using an adhesive. In various embodiments, the adhesive is a pressure sensitive adhesive. In certain embodiments, the first polymer, the second polymer, or a combination thereof are shape-memory polymers.

In one embodiment, an apparatus for attaching structures includes a first structure. In some embodiments, the apparatus includes a second structure. In various embodiments, the apparatus includes a first polymer coupled to the first structure. In certain embodiments, the first polymer has a first temperature profile and a first shape. In some embodiments, the apparatus includes a second polymer coupled to the second structure. In certain embodiments, the second polymer has a second temperature profile and a second shape. In various embodiments, the second temperature profile is different from the first temperature profile. In some embodiments, the second shape is different from the first shape. In certain embodiments, the second shape interlocks the first shape. In various embodiments, the first polymer and the second polymer secure the first structure to the second structure in response to the first polymer and the second polymer being in a first temperature range. In some embodiments, the first polymer and the second polymer release the first structure from the second structure in response to the first polymer and the second polymer being in a second temperature range different from the first temperature range.

In certain embodiments, the first temperature range is greater than the second temperature range. In one embodiment, the second temperature range includes a third temperature range greater than the first temperature range and a fourth temperature range less than the first temperature range. In certain embodiments, the first polymer is coupled to the first structure using an adhesive. In various embodiments, the adhesive is a pressure sensitive adhesive. In some embodiments, the first polymer, the second polymer, or a combination thereof are shape-memory polymers.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
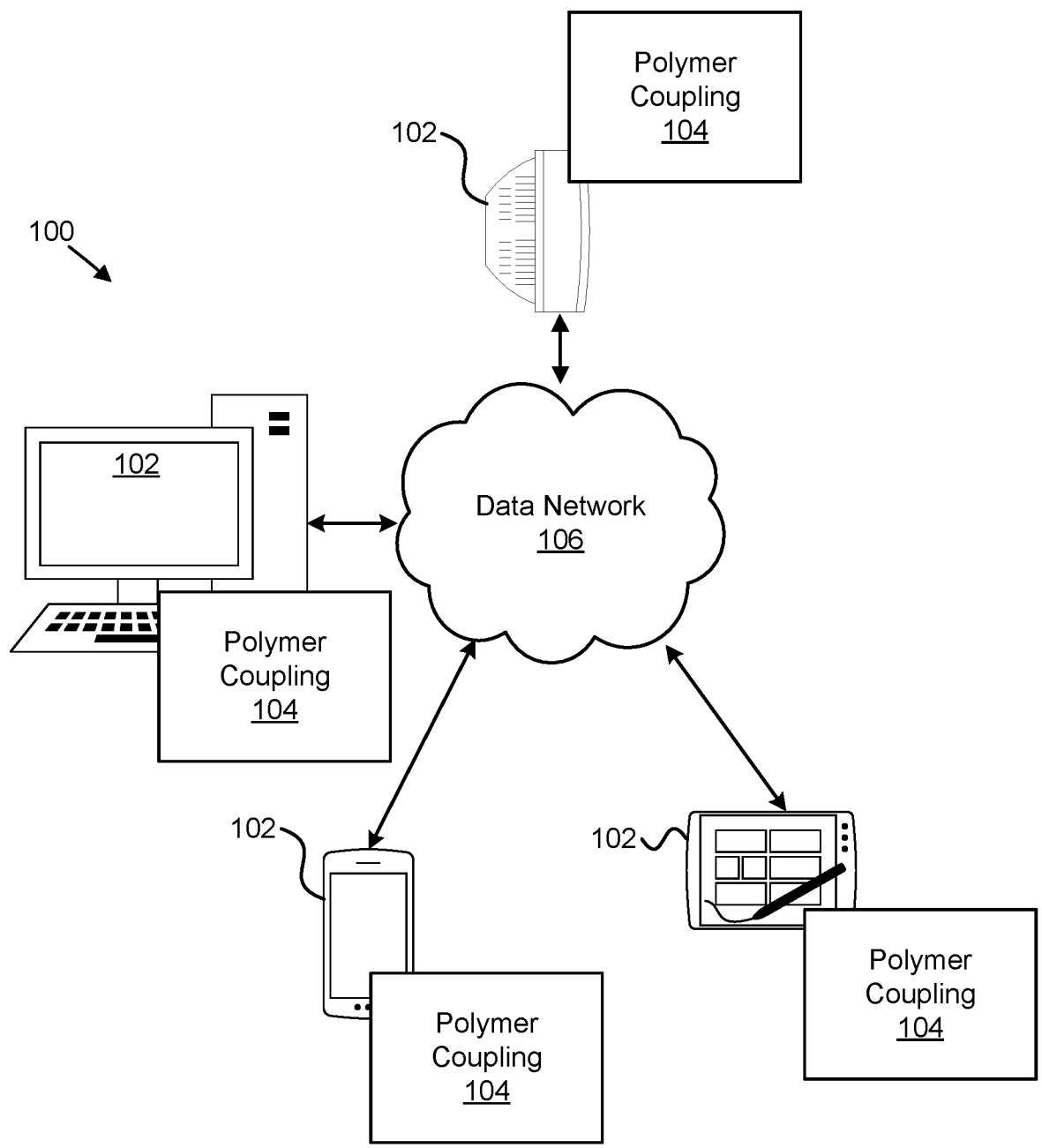
FIG. 1 is a schematic block diagram illustrating one embodiment of a system for attaching structures.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for attaching structures. In one embodiment, the system 100 includes information handling devices 102, polymer couplings 104, and data networks 106. Even though a specific number of information handling devices 102, polymer couplings 104, and data networks 106 are depicted in FIG. 1, one of skill in the art will recognize that any number of information handling devices 102, polymer couplings 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the polymer coupling 104. In certain embodiments, the polymer coupling 104 may include a first polymer that may be coupled to a first structure. In various embodiments, the first polymer has a first temperature profile and a first shape. In some embodiments, the polymer coupling 104 includes a second polymer that may be coupled to a second structure. In certain embodiments, the second polymer has a second temperature profile and a second shape. In various embodiments, the second temperature profile is different from the first temperature profile. In some embodiments, the second shape is different from the first shape. In certain embodiments, the second shape interlocks the first shape. In various embodiments, the first polymer and the second polymer secure the first structure to the second structure in response to the first polymer and the second polymer being in a first temperature range. In some embodiments, the first polymer and the second polymer release the first structure from the second structure in response to the first polymer and the second polymer being in a second temperature range different from the first temperature range.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
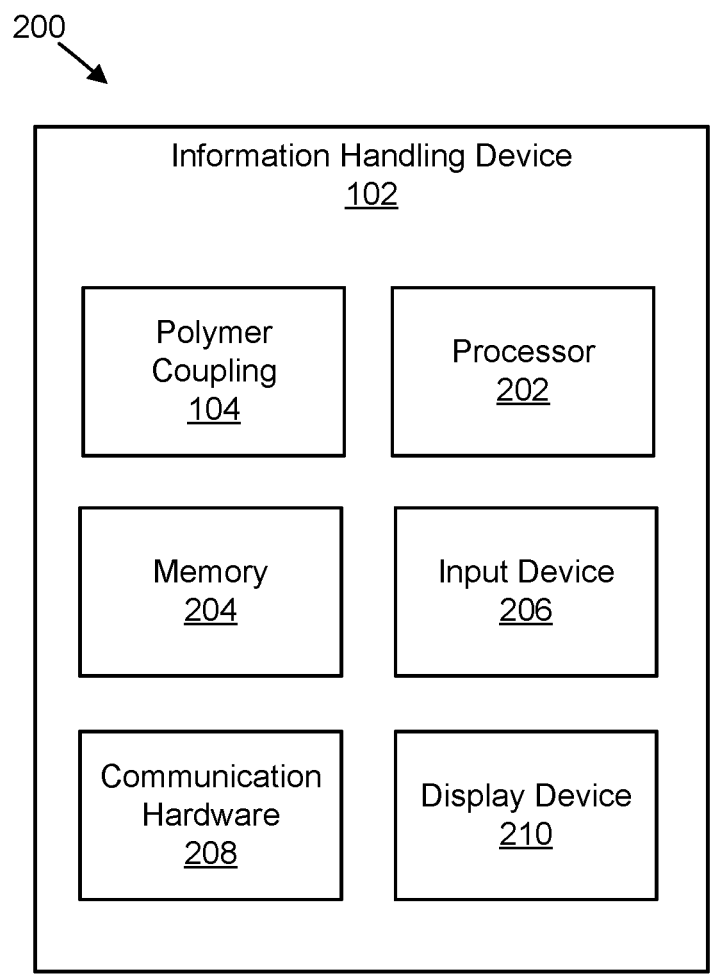
FIG. 2 is a schematic block diagram illustrating one embodiment of an apparatus including an information handling device.

FIG. 2 depicts one embodiment of an apparatus 200 that may be used for attaching structures. The apparatus 200 includes one embodiment of the information handling device 102. Furthermore, the information handling device 102 may include the polymer coupling 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the polymer coupling 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores program code and related data, such as an operating system or other controller algorithms operating on the information handling device 102.

The information handling device 102 may use the polymer coupling 104 for attaching structures. As may be appreciated, the polymer coupling 104 may include any suitable polymers for attaching structures. In one embodiment, the polymer coupling 104 may include a first polymer that may be coupled to a first structure of the information handling device 102. In various embodiments, the first polymer has a first temperature profile and a first shape. In some embodiments, the polymer coupling 104 may also include a second polymer that may be coupled to a second structure of the information handling device 102. In certain embodiments, the second polymer has a second temperature profile and a second shape. In various embodiments, the second temperature profile is different from the first temperature profile. In some embodiments, the second shape is different from the first shape. In certain embodiments, the second shape interlocks the first shape. In various embodiments, the first polymer and the second polymer secure the first structure to the second structure in response to the first polymer and the second polymer being in a first temperature range. In some embodiments, the first polymer and the second polymer release the first structure from the second structure in response to the first polymer and the second polymer being in a second temperature range different from the first temperature range.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202.

Figure 3:
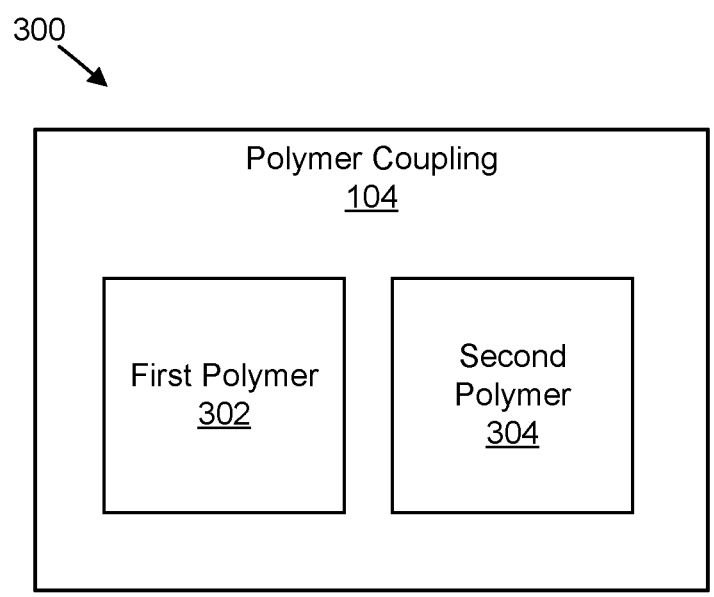
FIG. 3 is a schematic block diagram illustrating one embodiment of an apparatus including a polymer coupling.

FIG. 3 depicts a schematic block diagram illustrating one embodiment of an apparatus 300 that includes one embodiment of the polymer coupling 104. Furthermore, the polymer coupling 104 includes a first polymer 302 and a second polymer 304.

In some embodiments, the first polymer 302 and/or the second polymer 304 are shape-memory polymers. Moreover, the first polymer 302 and/or the second polymer 304 may be formed from polymeric smart materials that have shrinkage properties and/or shape changing properties. A shrinkage property of a polymer may result in the polymer at a cold temperature having a smaller size than the polymer at a hot temperature, or the polymer at a hot temperature having a smaller size than the polymer at a cold temperature. Different polymers may have different shrinkage properties so that they shrink at different ratios with the same temperature change. A shape changing property of a polymer may result in the polymer having an original (e.g., permanent) shape at a first temperature and the polymer having a deformed (e.g., temporary) shape at a second temperature.

The first temperature may be greater than the second temperature, or the first temperature may be less than the second temperature.

The first polymer 302 and the second polymer 304 may be formed from any suitable polymeric material, such as low-density polyethylene ("LDPE"), high-density polyethylene ("HDPE"), polypropylene ("PP"), polystyrene ("PS"), polytetrafluoroethylene ("PTFE"), polyvinyl chloride ("PVC"), polychlorotrifluoroethylene ("PCTFE"), polymethyl methacrylate ("PMMA"), polyethylene terephthalate ("PET"), polyamide ("PA"), polyoxymethylene ("POM"), polyvinylidene fluoride ("PVDF"), acrylonitrile butadiene styrene polymer ("ABS"), acrylonitrile styrene ("AS"), ethylene vinyl acetate ("EVA"), poly propylene with glass fibers (e.g., 10% glass, 20% glass, 40% glass, etc.), or other polymeric materials. While the first polymer 302 and the second polymer 304 are described herein as being polymers, in some embodiments, the first polymer 302 and/or the second polymer 304 may be formed from any material (e.g., alloy) having shape changing and/or shrinkage properties that change the size and/or shape of the material with an environmental change.

In certain embodiments, the first polymer 302 is coupled to a first structure to enable the first structure to be removably attached to a second structure. As may be appreciated, the first polymer 302 has a first temperature profile and a first shape. The first temperature profile and the first shape enable the first polymer 302 to behave in a certain way based on a temperature of the first polymer 302. The first temperature profile may result in the first polymer 302 having a shrinkage ratio of 0.1, 0.2, 0.4, 0.9, 0.7, 0.8, 0.9, 1.2, 2.5, or another ratio. In some embodiments, the first temperature profile may result in the first polymer 302 having a shrinkage ratio within a range of 0.2 to 0.7, 0.2 to 0.8, 0.4 to 0.7, 0.4 to 0.9, 0.7 to 1.2, 1.0 to 2.5, 0.1 to 3.0, or within another range.

In some embodiments, the second polymer 304 is coupled to the second structure to enable the second structure to be removably attached to the first structure. As may be appreciated, the second polymer 304 has a second temperature profile and a second shape. The second temperature profile and the second shape enable the second polymer 304 to behave in a certain way based on a temperature of the second polymer 304. The second temperature profile may result in the second polymer 304 having a shrinkage ratio of 0.1, 0.2, 0.4, 0.9, 0.7, 0.8, 0.9, 1.2, 2.5, or another ratio. In some embodiments, the second temperature profile may result in the second polymer 304 having a shrinkage ratio within a range of 0.2 to 0.7, 0.2 to 0.8, 0.4 to 0.7, 0.4 to 0.9, 0.7 to 1.2, 1.0 to 2.5, 0.1 to 3.0, or within another range.

Figure 5:
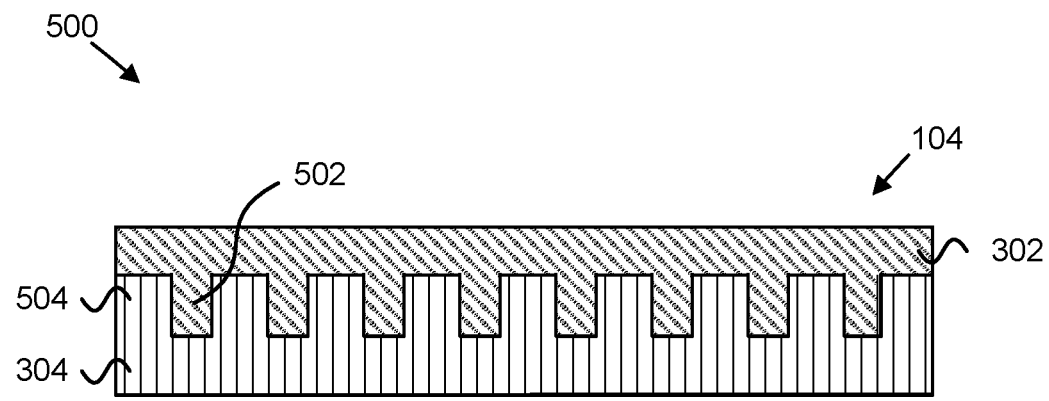
FIG. 5 is a schematic block diagram illustrating another embodiment of an apparatus including a polymer coupling.
Figure 6:
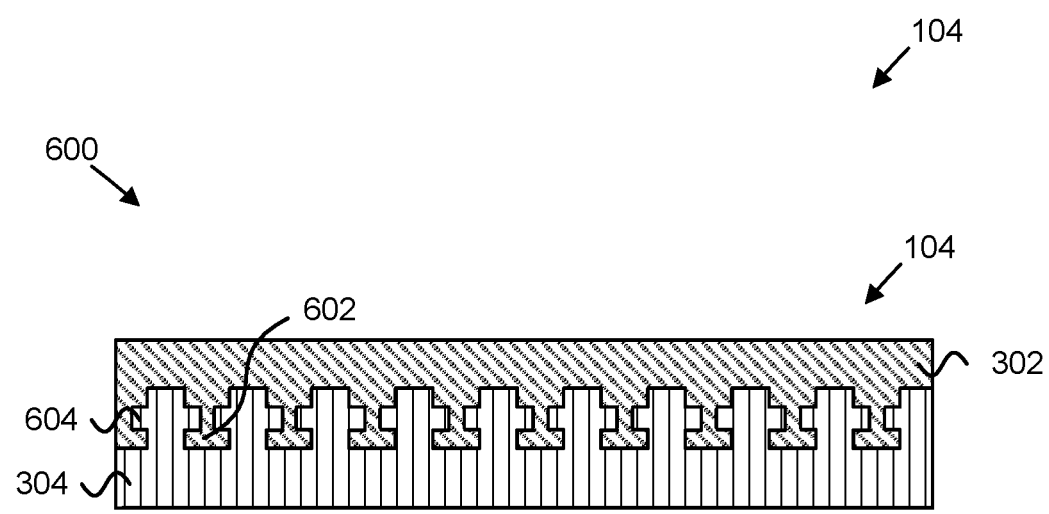
FIG. 6 is a schematic block diagram illustrating a further embodiment of an apparatus including a polymer coupling.

The second temperature profile is different from the first temperature profile so that the first polymer 302 has a different shrinkage ratio than the second polymer 304. By having different shrinkage ratios, the first polymer 302 may be secured to the second polymer 304 at one temperature and the first polymer 302 may be released from the second polymer 304 at another temperature. Moreover, the second shape is different from the first shape so that the second shape interlocks the first shape as illustrated in FIGS. 5 and 6.

As described herein, because of their different temperature profiles, the first polymer 302 and the second polymer 304 secure the first structure to the second structure in response to the first polymer and the second polymer being in a first temperature range (e.g., a temperature above a low temperature, a temperature below a high temperature, a temperature between a low temperature and a high temperature, a nominal temperature range, room temperature range).

Moreover, because of their different temperature profiles, the first polymer 302 and the second polymer 304 release (e.g., with mild pressure applied) the first structure from the second structure in response to the first polymer 302 and the second polymer 304 being in a second temperature range (e.g., a temperature below a low temperature, a temperature above a high temperature, a temperature below a low temperature and above a high temperature, a temperature outside of a nominal temperature range, a temperature outside of a room temperature range) different from the first temperature range.

In some embodiments, the first temperature profile has a different melting temperature than the second temperature profile. In such embodiments, the polymer with the highest melting temperature may be formed first, then the polymer with the lowest melting temperature may be formed without melting the polymer with the highest melting temperature. In certain embodiments, the first temperature range is greater than the second temperature range, while in other embodiments the first temperature range is less than the second temperature range. In various embodiments, the second temperature range comprises a third temperature range greater than the first temperature range and a fourth temperature range less than the first temperature range. In some embodiments, the first temperature range comprises a third temperature range greater than the second temperature range and a fourth temperature range less than the second temperature range.

In certain embodiments, the first polymer 302 is coupled to a first structure using an adhesive. In such embodiments, the adhesive may be a pressure sensitive adhesive. The adhesive may permanently secure the first polymer 302 to the first structure. In various embodiments, the second polymer 304 is coupled to a second structure using an adhesive. In such embodiments, the adhesive may be a pressure sensitive adhesive. The adhesive may permanently secure the second polymer 304 to the second structure.

Figure 4:
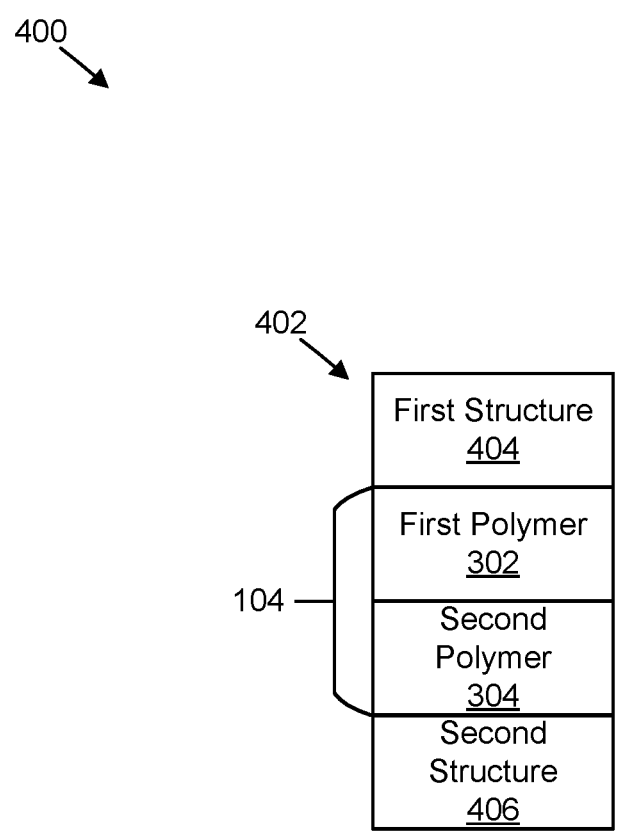
FIG. 4 is a schematic block diagram illustrating one embodiment of a system including a device having a polymer coupling.

FIG. 4 is a schematic block diagram illustrating one embodiment of a system 400 including a device 402 having the polymer coupling 104. The device 402 includes a first structure 404 attached to a second structure 406 via the polymer coupling 104. As may be appreciated, the device 402 may be any suitable device, such as a computer, a phone, a tablet, a keyboard, a mouse, a display, an automotive part, an electronic device, a building component, a construction device, an industrial device, or any other device. The first structure 404 may be one side of an assembly, and the second structure 406 may be another side of the assembly.

As may be appreciated, the first structure 404 may be permanently attached to the first polymer 302 and the second structure 406 may be permanently attached to the second polymer 304. However, the first structure 404 is removably attached to the second structure 406 using the polymer coupling 104. Because of the different temperature profiles of the first polymer 302 and the second polymer 304, at one temperature the first polymer 302 is securely attached to the second polymer 304 thereby holding the first structure 404 securely to the second structure 406, and at another temperature the first polymer 302 is not securely attached (e.g., loosened, disconnected, movable from, released, etc.) to the second polymer 304 thereby releasing the first structure 404 from the second structure 406. As may be appreciated, even while the first polymer 302 is not securely attached to the second polymer 304, some force may be applied to separate the first polymer 302 from the second polymer 304.

By using the polymer coupling 104, the first structure 404 may be easily removed from the second structure 406 without removing screws and/or without removing an adhesive that would have to be reapplied with reassembly. Indeed, reassembly of the first structure 404 with the second structure 406 may be done by changing the temperature from a first temperature to a second temperature, pressing the first structure 404 to the second structure 406, and changing the temperature back from the second temperature to the first temperature.

FIG. 5 is a schematic block diagram illustrating another embodiment of an apparatus 500 including the polymer coupling 104. The polymer coupling 104 includes the first polymer 302 and the second polymer 304. The first polymer 302 has a first shape 502 (e.g., pattern) and the second polymer 304 has a second shape 504 (e.g., pattern) different from the first shape 502. The first shape 502 interlocks the second shape 504. Indeed, the first shape 502 is able to interlock the second shape 504 because the first shape 502 is complementary to the second shape 504. In the illustrated embodiment, the first shape 502 and the second shape 504 are both teeth shaped. The teeth of the first shape 502 may be the same size as the teeth of the second shape 504, or the teeth of the first shape 502 may be a different size than the teeth of the second shape 504.

At a first temperature (e.g., room temperature), the first polymer 302 is secured to the second polymer 304. Moreover, at a second temperature (e.g., hot temperature, cold temperature, less than the room temperature, greater than the room temperature) different from the first temperature, the first polymer 302 is released from the second polymer 304. The first polymer 302 may be released from the second polymer 304 because the first polymer 302 may have a different shrinkage ratio than the second polymer 304 resulting in a loose fit between the first polymer 302 and the second polymer 304.

As may be appreciated, the interlocking portions of the first shape 502 and the second shape 504 may have any suitable pattern. For example, the interlocking portions may be square, rectangular, triangular, zipper shaped, T-shaped (with a complementary interlocking shape), t-shaped (with a complementary interlocking shape), partial T-shaped (with a complementary interlocking shape), hook shaped (with a complementary interlocking shape), circular (with a complementary interlocking shape), and so forth. One example of another interlocking portion is illustrated in FIG. 6.

FIG. 6 is a schematic block diagram illustrating a further embodiment of an apparatus 600 including the polymer coupling 104. The polymer coupling 104 includes the first polymer 302 and the second polymer 304. The first polymer 302 has a first shape 602 (e.g., pattern) and the second polymer 304 has a second shape 604 (e.g., pattern) different from the first shape 602. The first shape 602 interlocks the second shape 604. Indeed, the first shape 602 is able to interlock the second shape 604 because the first shape 602 is complementary to the second shape 604. In the illustrated embodiment, the first shape 602 is I-shaped and the second shape 504 is t-shaped.

At a first temperature (e.g., room temperature), the first polymer 302 is secured to the second polymer 304. Moreover, at a second temperature (e.g., hot temperature, cold temperature, less than the room temperature, greater than the room temperature) different from the first temperature, the first polymer 302 is released from the second polymer 304. The first polymer 302 may be released from the second polymer 304 because the first polymer 302 may have a different shrinkage ratio than the second polymer 304 resulting in a loose fit between the first polymer 302 and the second polymer 304.

Figure 7:
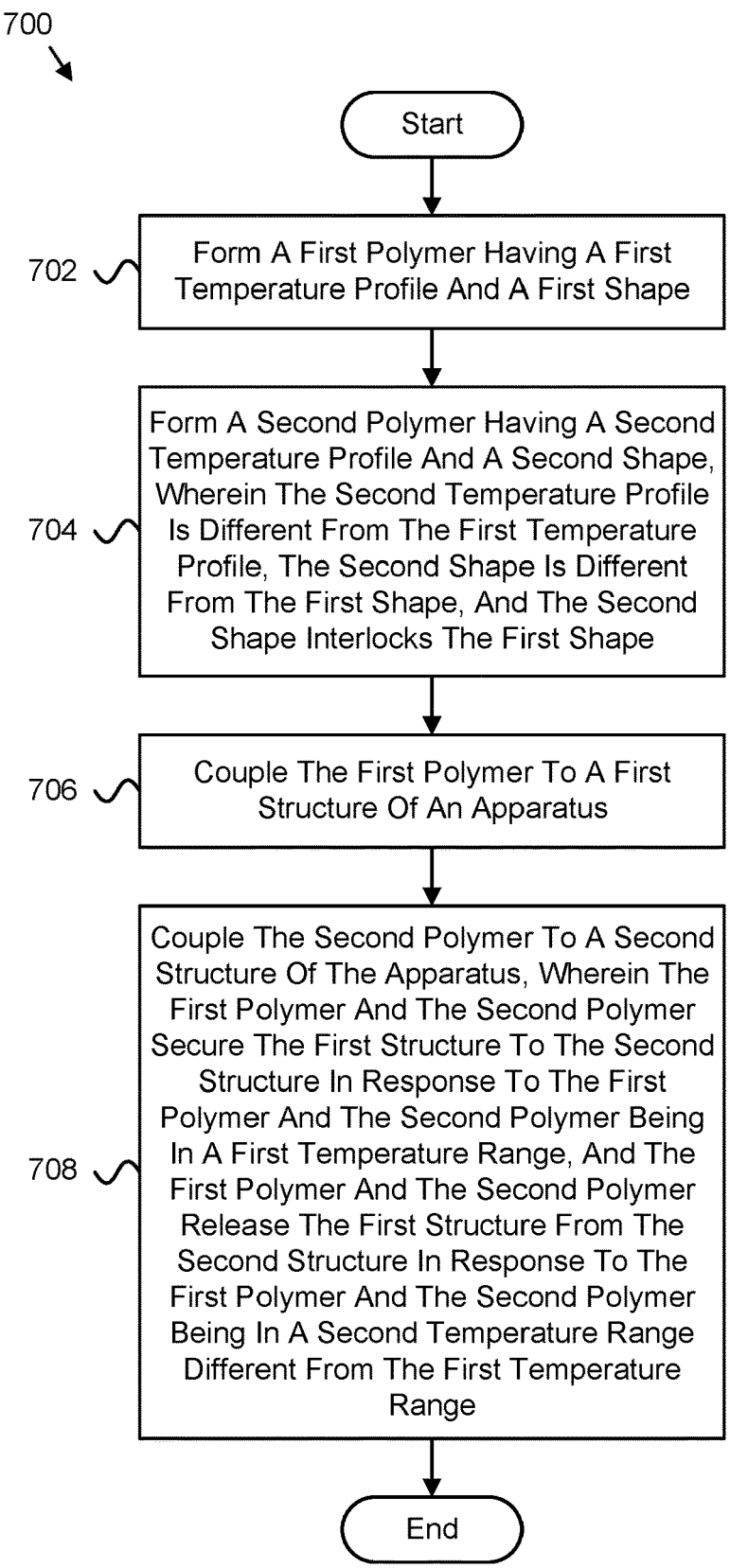
FIG. 7 is a schematic flow chart diagram illustrating an embodiment of a method for attaching structures.

FIG. 7 is a schematic flow chart diagram illustrating an embodiment of a method 700 for attaching structures. In some embodiments, the method 700 is performed by a system, such as the system 400. In other embodiments, the method 700 may be performed by a different apparatus or system. In certain embodiments, the method 700 may be performed using a processor executing program code, for example, a microcontroller, a microprocessor, a CPU, a GPU, an auxiliary processing unit, a FPGA, or the like.

In various embodiments, the method 700 may include forming 702 a first polymer (e.g., the first polymer 302) having a first temperature profile and a first shape. In some embodiments, the first polymer may be formed by using a mold, injection molding, or using another forming method.

In certain embodiments, the method 700 includes forming 704 a second polymer (e.g., the second polymer 304) having a second temperature profile and a second shape. In such embodiments, the second temperature profile is different from the first temperature profile, the second shape is different from the first shape, and the second shape interlocks the first shape. In some embodiments, the second polymer may be formed by using a mold, injection molding, or using another forming method.

In some embodiments, the method 700 includes coupling 706 the first polymer to a first structure of an apparatus. In certain embodiments, the first polymer may be coupled to the first structure of the apparatus using an adhesive. Moreover, the adhesive may be a pressure sensitive adhesive that is a non-reactive adhesive that forms a bond in response to pressure being applied to bond the adhesive to the first polymer and the first structure. For example, the pressure sensitive adhesive may be a tape, a label, a glue dot, a trim, or so forth. The adhesive may also be a non-pressure sensitive adhesive, such as a glue, a bonding material, an epoxy, a polyurethane, a spray adhesive, and so forth.

In various embodiments, the method 700 includes coupling 708 the second polymer to a second structure of the apparatus. In such embodiments, the first polymer and the second polymer secure the first structure to the second structure in response to the first polymer and the second polymer being in a first temperature range, and the first polymer and the second polymer release the first structure from the second structure in response to the first polymer and the second polymer being in a second temperature range different from the first temperature range.

In certain embodiments, the second polymer may be coupled to the second structure of the apparatus using an adhesive. Moreover, the adhesive may be a pressure sensitive adhesive that is a non-reactive adhesive that forms a bond in response to pressure being applied to bond the adhesive to the second polymer and the second structure. For example, the pressure sensitive adhesive may be a tape, a label, a glue dot, a trim, or so forth. The adhesive may also be a non-pressure sensitive adhesive, such as a glue, a bonding material, an epoxy, a polyurethane, a spray adhesive, and so forth.

In some embodiments, the first polymer and/or the second polymer are shape-memory polymers. Moreover, the first temperature profile may have a different shrinkage ratio than the second temperature profile. Furthermore, the first temperature profile may have a different melting temperature than the second temperature profile. In some embodiments, the first temperature range is greater than the second temperature range, while in other embodiments the first temperature range is less than the second temperature range. In various embodiments, the second temperature range includes a third temperature range greater than the first temperature range and a fourth temperature range less than the first temperature range.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a device comprising a first structure attached to a second structure;
   a first polymer coupled to the first structure, wherein the first polymer comprises a first temperature profile and a first shape; and
   a second polymer coupled to the second structure, wherein:
     the second polymer comprises a second temperature profile and a second shape;
     the second temperature profile is different from the first temperature profile;
     the second shape is different from the first shape;
     the second shape interlocks the first shape;
     the first polymer and the second polymer secure the first structure to the second structure in response to the first polymer and the second polymer being in a first temperature range; and
     the first polymer and the second polymer release the first structure from the second structure in response to the first polymer and the second polymer being in a second temperature range different from the first temperature range.

2. The system of claim 1, wherein the device is selected from a group comprising a computer, a phone, a tablet, a keyboard, a mouse, and a display.

3. The system of claim 1, wherein the first temperature profile has a different shrinkage ratio than the second temperature profile.

4. The system of claim 1, wherein the first temperature range has all values greater than a greatest temperature of the second temperature range.

5. The system of claim 1, wherein the first temperature range has all values less than a lowest temperate of the second temperature range.

6. A method comprising:
   forming a first polymer having a first temperature profile and a first shape;
   forming a second polymer having a second temperature profile and a second shape, wherein the second temperature profile is different from the first temperature profile, the second shape is different from the first shape, and the second shape interlocks the first shape;
   coupling the first polymer to a first structure of an apparatus; and
   coupling the second polymer to a second structure of the apparatus, wherein the first polymer and the second polymer secure the first structure to the second structure in response to the first polymer and the second polymer being in a first temperature range, and the first polymer and the second polymer release the first structure from the second structure in response to the first polymer and the second polymer being in a second temperature range different from the first temperature range.

7. The method of claim 6, wherein the first temperature profile has a different shrinkage ratio than the second temperature profile.

8. The method of claim 6, wherein the first temperature profile has a different melting temperature than the second temperature profile.

9. The method of claim 6, wherein the first temperature range has all values greater than a greatest temperature of the second temperature range.

10. The method of claim 6, wherein the first temperature range has all values less than a lowest temperature of the second temperature range.

11. The method of claim 6, wherein the second temperature range comprises a third temperature range having all values greater than a greatest temperature of the first temperature range and a fourth temperature range having all values less than a lowest temperature of the first temperature range.

12. The method of claim 6, wherein coupling the first polymer to the first structure of the apparatus comprises coupling the first polymer to the first structure of the apparatus using an adhesive.

13. The method of claim 12, wherein the adhesive is a pressure sensitive adhesive.

14. The method of claim 6, wherein the first polymer, the second polymer, or a combination thereof are shape-memory polymers.

15. An apparatus comprising:
    a first structure;
    a second structure;
    a first polymer coupled to the first structure, wherein the first polymer comprises a first temperature profile and a first shape; and
    a second polymer coupled to the second structure, wherein:
      the second polymer comprises a second temperature profile and a second shape;
      the second temperature profile is different from the first temperature profile;
      the second shape is different from the first shape;
      the second shape interlocks the first shape;
      the first polymer and the second polymer secure the first structure to the second structure in response to the first polymer and the second polymer being in a first temperature range; and
      the first polymer and the second polymer release the first structure from the second structure in response to the first polymer and the second polymer being in a second temperature range different from the first temperature range.

16. The apparatus of claim 15, wherein the first temperature range has all values greater than a greatest temperature of the second temperature range.

17. The apparatus of claim 15, wherein the second temperature range comprises a third temperature range having all values greater than a greatest temperature of the first temperature range and a fourth temperature range having all values less than a lowest temperature of the first temperature range.

18. The apparatus of claim 15, wherein the first polymer is coupled to the first structure using an adhesive.

19. The apparatus of claim 18, wherein the adhesive is a pressure sensitive adhesive.

20. The apparatus of claim 15, wherein the first polymer, the second polymer, or a combination thereof are shape-memory polymers.

\* \* \* \* \*